(12) United States Patent
Eklund et al.

(10) Patent No.: US 9,181,460 B2
(45) Date of Patent: Nov. 10, 2015

(54) GAS TRANSMITTING POLYURETHANE ADHESIVE

(71) Applicant: H.B. FULLER COMPANY, St. Paul, MN (US)

(72) Inventors: Wayne G. Eklund, Scandia, MN (US); Stephen G. Rippe, White Bear Lake, MN (US)

(73) Assignee: H.B. Fuller Company, St. Paul, MN (US)

( * ) Notice: Subject to any disclaimer, the term of this patent is extended or adjusted under 35 U.S.C. 154(b) by 318 days.

(21) Appl. No.: 13/787,154

(22) Filed: Mar. 6, 2013

(65) Prior Publication Data

US 2014/0255560 A1    Sep. 11, 2014

(51) Int. Cl.
| | |
|---|---|
| C09J 9/00 | (2006.01) |
| B65D 75/26 | (2006.01) |
| B32B 7/12 | (2006.01) |
| B65D 65/40 | (2006.01) |
| C08G 18/62 | (2006.01) |
| C08G 18/79 | (2006.01) |
| C08G 18/10 | (2006.01) |
| C08G 18/12 | (2006.01) |
| C08G 18/40 | (2006.01) |
| C09J 175/04 | (2006.01) |

(52) U.S. Cl.
CPC ... *C09J 9/00* (2013.01); *B32B 7/12* (2013.01); *B65D 65/40* (2013.01); *B65D 75/26* (2013.01); *C08G 18/10* (2013.01); *C08G 18/12* (2013.01); *C08G 18/4063* (2013.01); *C08G 18/6229* (2013.01); *C08G 18/797* (2013.01); *C09J 175/04* (2013.01); *B32B 2439/70* (2013.01); *Y10T 428/31551* (2015.04); *Y10T 428/31587* (2015.04); *Y10T 428/31591* (2015.04)

(58) Field of Classification Search
CPC ................................. C09J 9/00; B65D 75/26
USPC .............. 428/423.1, 424.8, 425.1; 156/331.7; 525/127
See application file for complete search history.

(56) References Cited

U.S. PATENT DOCUMENTS

| | | | |
|---|---|---|---|
| 4,443,590 A * | 4/1984 | Kamatani et al. ............... | 528/51 |
| 5,763,527 A | 6/1998 | Chen et al. | |
| 5,783,270 A | 7/1998 | Fischer et al. | |
| 6,358,357 B1 | 3/2002 | Lamber et al. | |
| 2003/0036604 A1 | 2/2003 | Meisenburg et al. | |
| 2006/0233987 A1 | 10/2006 | Mumpower | |
| 2007/0179254 A1* | 8/2007 | Wang et al. ................... | 525/440 |
| 2007/0232764 A1* | 10/2007 | Minamida et al. ............ | 525/453 |
| 2010/0178502 A1* | 7/2010 | Spilman et al. ........... | 428/355 R |

FOREIGN PATENT DOCUMENTS

| | | |
|---|---|---|
| EP | 0 849 343 | 6/1998 |
| WO | WO 93/05099 | 3/1993 |

OTHER PUBLICATIONS

BASF, Safety Data Sheet: JONCRYL 960, Sep. 8, 2010.
Polymer Products From Aldrich Thermal, "Thermal Transitions of Homopolymers: Glass Transition & Melting Point", Oct. 24, 2008.

* cited by examiner

*Primary Examiner* — Thao T Tran
(74) *Attorney, Agent, or Firm* — Kirsten Stone; Bin Su

(57) ABSTRACT

A two-part, solvent-free laminating adhesive including a Part A that is a liquid mixture of a first polyol and a hydroxyl functional acrylic polymer having a molecular weight of no greater than 15,000 g/mole, and a Part B that is an isocyanate-terminated polyurethane prepolymer. The adhesive is especially suited for making flexible laminates for use in food packaging. When adhered two polymeric film materials and in cured form, the adhesive provides substantially no contribution to the oxygen barrier properties of the laminate.

20 Claims, No Drawings

GAS TRANSMITTING POLYURETHANE ADHESIVE

BACKGROUND OF THE INVENTION

Isocyanate-based adhesives can be used to manufacture laminates for use in flexible packaging. These adhesives are curable two-part compositions where a polyol (Part A) and an isocyanate-terminated polyurethane prepolymer (Part B) are mixed immediately before the laminating process, and are used to adhere superimposed layers of substrates. Flexible packaging is particularly useful as food packaging.

Certain perishable food items, particularly fresh produce e.g., fruits and vegetables, even after harvested, continue their respiratory functions for an extended period of time. Packaging with gas transmission characteristics allows the fresh produce to respire so that they can maintain their freshness longer.

SUMMARY OF THE INVENTION

In one aspect, the present disclosure relates a two-part, solvent-free laminating adhesive useful for making a laminate including a first polymeric film and the second polymeric film. The adhesive includes a Part A and a Part B. Part A is a mixture of (i) from about 20% by weight to about 80% by weight of a first polyol selected from the group consisting of polyether polyols, polyester polyols, polyester/polyether polyols, natural oil polyols, and combinations thereof; and (ii) from about 20% by weight to about 80% by weight of a hydroxyl functional acrylic polymer having a weight average molecular weight of no greater than 15,000 g/mole, a glass transition temperature (Tg) of no greater than 20° C., and a hydroxyl number of from about 10 to about 110. The first polyol and the hydroxyl functional acrylic polymer are co-dissolved so as to form a homogeneous liquid solution. Part B is an isocyanate-terminated polyurethane (prepolymer having a percent isocyanate (NCO %) of from about 4% to about 20%, based on the weight of the prepolymer. Part B is present relative to Part A at an NCO/OH ratio of at least about 1.1:1. The Part A and Part B of the adhesive are formulated such that when the adhesive is used at a thickness of 0.08 mil to adhere the first polymeric film to the second polymeric film, which in combination provide an oxygen transmission rate (OTR) of at least about 180 cc/(100 in$^2$-day) and cured, the laminate exhibits an oxygen transmission rate (OTR) decrease of no greater than 7%, relative to the oxygen transmission rate of the first and second polymeric films in combination without the adhesive.

In one embodiment, the first polyol in Part A is a polyether polyol having a number average molecular weight (MN) of no less than 1,000 g/mole.

In one embodiment, the first polyol in Part A is a castor oil polyol.

In one embodiment, the first polyol in Part A is a combination of a polyether polyol having a number average molecular weight of no less than 1,000 g/mole and a castor oil polyol.

In one embodiment, the isocyanate-terminated polyurethane prepolymer in Part B is a reaction product of any one of the aforementioned first polyol and a polyisocyanate at an NCO/OH ratio of at least about 2:1.

In one embodiment, the isocyanate-terminated polyurethane prepolymer in Part B is a reaction product of any one of the aforementioned first polyol and a carbodiimide-modified diphenylmethane diisocyanate.

In one embodiment, the adhered laminate exhibits an oxygen transmission rate (OTR) decrease of no greater than 3%.

In yet another aspect, the present disclosure relates to a two-part solvent-free laminating adhesive for a laminate. The adhesive includes Part (A) a hydroxyl functional acrylic polymer having a weight average molecular weight of no greater than 15,000 g/mole, a glass transition temperature (Tg) of no greater than 20° C., a hydroxyl number of from about 10 to about 110, and a viscosity of no greater than 8,000 cps at 77° F., and Part (B), an isocyanate-terminated polyurethane prepolymer having a percentage isocyanate (NCO %) of from about 4% to about 20% based on the weight of the prepolymer. The Part (B) is present relative to the Part (A) at an NCO/OH ratio of at least about 1.1:1. The laminate exhibits an oxygen transmission rate (OTR) percent decrease of no greater than 7% according to the herein described OTR Percent Decrease Determination Method.

In one embodiment, Part A further includes a first polyol selected from the group consisting of polyether polyols, polyester polyols, polyester/polyether polyols, natural oil polyols, and combinations thereof.

In another aspect, the present disclosure relates to a method of making a laminate. The laminate includes at least a first substrate and a second substrate. The method includes applying any one of the aforementioned adhesives to a surface of the first substrate to form an adhesive bearing surface of the first substrate, and contacting a surface of the second substrate with the adhesive-bearing surface of the first substrate to form the laminate.

In one embodiment, the first and/or the second substrates are a flexible polymeric film.

In another aspect, the present disclosure relates to a laminate for packaging. The laminate includes a first substrate, a second substrate, and any one of the aforementioned adhesives laminated between the first and the second substrates.

In one embodiment, the first and/or the second substrates are a flexible polymeric film.

In another aspect, the present disclosure relates to a packaged food article that includes any one of the aforementioned laminates in a form of a food package, and a food product contained inside of the food package.

DETAILED DESCRIPTION OF THE INVENTION

The present disclosure relates to a laminating adhesive, a laminate, a packaged food article, and a method of making the laminate using the laminating adhesive.

Laminating Adhesive Composition

The laminating adhesive is a two-part, solvent-free polyurethane composition, which is a liquid at an ambient temperature, e.g., 77° F. Herein, a composition is considered to be a liquid if it is liquid at an ambient temperature, e.g., 77° F.

The laminating adhesive composition has an initial viscosity of no greater than 4,000 centipoises (cps), or no greater than 3,000 cps, or no greater than 2,000 cps at 105° F. Initial viscosity of the adhesive herein refers to the viscosity determined immediately after Part A and Part B are combined.

In one embodiment, the laminating adhesive composition includes a Part A, which is a liquid mixture of a first polyol and a hydroxyl functional acrylic polymer, and a Part B, which is an isocyanate-terminated polyurethane prepolymer.

In one embodiment, the laminating adhesive composition includes a Part A, which is a hydroxyl functional acrylic polymer, and a Part B, which is an isocyanate-terminated polyurethane prepolymer. In another embodiment, the Part A further includes first polyol.

The two parts, Part A and Part B, are kept separate prior to the application, and are mixed immediately before the application in the laminating process. Upon laminating and curing, an adhesive bond forms that adheres the superimposed layers of substrate materials together.

The polyol (Part A) and the prepolymer (Part B) are blended together immediately prior to the laminating process such that the equivalent ratio of isocyanate groups (NCO) from the prepolymer (Part B) to the hydroxyl groups (OH) from the polyol (Part A) (i.e., NCO/OH ratio) is at least about 1.1:1, or in a range from about 1.1:1 to about 1.4:1.

Food packaging for various types of food, especially fresh produce, often utilizes laminates of two or more sheets or films of polymeric material, which may be the same or different material. In selecting a film material for making laminates, among other considerations, the film materials may be selected for their gas transmission property so that the films in combination provide a predictable gas transmission rate, particularly a predictable oxygen transmission rate (OTR).

The adhesive layer(s) between the film materials of the laminate also impact the gas transmission properties of the laminate. Since the food packager has selected the films for particular gas transmission properties, significant contribution by the adhesive is undesirable. In particular, the smaller the contribution of the adhesive to the gas barrier properties of the laminate, the better the laminating adhesive is for fresh produce packaging.

The laminating adhesive of the invention, when used as fresh produce packaging adhesive, exhibits substantially no, or no oxygen barrier, as expressed by oxygen transmission rate (OTR) percent decrease (%).

Herein, oxygen transmission rate (OTR) is determined by the herein described OTR Test Method. Oxygen transmission rate (OTR) percent decrease (%) of an adhered laminate is determined relative to the oxygen transmission rate of the same laminating materials in combination without an adhesive.

In some embodiments, the adhesive is formulated such that the adhered laminate exhibits an oxygen transmission rate percent decrease of no greater than 7%, or no greater than 5%, or no greater than 4%, or even no greater than 3%.

In addition to substantially no or no oxygen barrier, the disclosed adhesive composition has additional advantages. For example, the adhesive composition is substantially free of a solvent, such as no greater than 0.5% solvent. In some embodiments, the adhesive composition is solventless, therefore, it does not include any volatile organic compounds (VOCs).

The adhesive composition cures quickly and also has a workable viscosity and pot life. Finally, the adhesive composition provides a strong adhesive bond that is resistant to heat, humidity, and chemicals. In some embodiments for food application, the components of the adhesive composition are made exclusively of materials that are acceptable for indirect food contact according to the Food and Drug Administration (FDA) guidelines 21 CFR 175.105. Thus, the adhesive composition is safe to be used for making laminates for packaging food.

Part A—a Polyol and a Hydroxyl Functional Acrylic Polymer

In one embodiment, Part A of the laminating adhesive includes a homogeneous liquid mixture of (i) from about 20% by weight, or about 40% by weight to about 80% by weight, or to about 60% by weight of a polyol and (ii) from about 20% by weight, or about 40% by weight to about 80% by weight, or about 60% by weight of a hydroxyl functional acrylic polymer, based on the weight of the mixture. The polyol and the hydroxyl functional acrylic polymer are co-dissolved so as to form a homogeneous liquid solution at an ambient temperature, which has a viscosity of from about 250 cps to no greater than 10,000 cps, or no greater than 5,000 cps, or no greater than 2,000 cps at 77° F.

In one embodiment, Part A of the laminating adhesive includes a liquid hydroxyl functional acrylic polymer, which has a viscosity of no greater than 8,000 cps, or no greater than 5,000 at 77° F. In another embodiment, Part A may further include a polyol as herein described.

Polyol

Polyol in Part A of the adhesive composition is a liquid at ambient temperature, e.g., 77° F., and may also be refened to as a first polyol herein.

Suitable polyols in Part A include polyether polyols, polyester polyols, polyether/polyester polyols, hydroxyl functional nature oil polyols, and combinations thereof. Suitable polyols in Part A have a hydroxyl functionality of at least about 1.5, or at least about 2, or at least about 3, and no greater than about 4, or no greater than about 3.5.

Selection of the polyol in Part A is within the constraints that the polyol or mixture of polyols be liquid at ambient temperature, that the Part A of the adhesive composition be liquid at ambient temperature, and that the OTR contribution of the cured adhesive be within the ranges set forth herein. Within these constraints, the hydroxyl number of the polyol may vary over a wide range, e.g., from about 25 to about 300, and preferably, from about 80 and about 150. The polyol preferably has a number average molecular weight of from about 600 to about 5000 g/mole.

Examples of suitable polyether polyols in Part A include those that have a number average molecular weight of no less than 1,000 g/mole, or from about 1000 g/mole to about 11,000 g/mole, such as products Obtained from the polymerization of a cyclic oxide, e.g., ethylene oxide, propylene oxide, butylene oxide, and tetrahydroliiran, or by the addition of one or more such oxides to polyfunctional initiators having at least two active hydrogens, e.g., water, polyhydric alcohols (e,g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and triols obtained by the simultaneous or sequential addition of ethylene oxide and propylene oxide to appropriate initiators and polytetramethylene ether glycols obtained by the polymerization of tetrahydrofuran.

Examples of preferred poly-ether polyols in Part A include a poly(alkylene oxide), such as poly(propylene oxide), poly (ethylene oxide) or ethylene oxide/propylene oxide copolymer with poly(propylene oxide) most preferred.

Useful polyester polyols in Part A are prepared from the reaction product of polycarboxylic acids, their anhydrides, their esters or their halides, and a stoichiometric excess polyhydric alcohol. Suitable polycarboxylic acids include dicarboxylic acids and tricarboxyl acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydroplinhalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, and fumaric acid), and alicyclic dicarboxylic acids (e.g. 1,3-cyclohexanedicarboxylic acid, and 1,4-cyclohexanedicarboxylic acid).

Examples of suitable polyols from which polyester polyols in Part A can be derived include aliphatic polyols, e.g., ethylene glycols, propane diols (e.g., 1,2-propanediol and 1,3-propanediol), butane diols (e.g., 1,3-butanediol, 1,4-butanediol, and 1,2-butanedial), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentylglycol, 1,4-cyclohexanedimethanol, 1,4-cyclohexanediol, dimer diols, bisphenol A, bisphenol F, hydrogenated bisphenol A, hydrogenated bisphenol F, glycerol, tetramethylene glycol, poly-tetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof.

Examples of suitable polyols in Part A also include natural oil polyols with hydroxyl functionality of from about 1 to about 8, and preferably from about 1.5 to about 4. Examples of suitable natural oil polyol include such as soybean oil, castor oil and rapeseed oil, as well as to those hydroxyl functional compounds that are isolated from, derived from or manufactured from natural oils including animal and vegetable oils, preferably vegetable oils. Examples of vegetable and animal oils that may be used include, but are not limited to, soybean oil, safflower oil, linseed oil, corn oil, sun-flower oil, castor oil, olive oil, canola oil, sesame oil, cottonseed oil, palm oil, rapeseed oil, tung oil, fish or a blend of any of these oils. Alternatively, any partially hydrogenated or epoxidized natural oil or genetically modified natural oil can be used to obtain the desired hydroxyl functionality. Examples of such oils include, but are not limited to, high oleic safflower oil, high oleic soybean oil, high oleic peanut oil, high oleic sun-flower oil (such as NuSun sunflower oil), high oleic canola oil, and high erucic rapeseed oil (such as Crumbe oil).

Examples of other suitable polyols in Part A also include polyester/polyether polyols as well as mixtures of the aforementioned polyether polyols, polyester polyols, polyester/poly-ether polyols, and natural oil polyols.

Hydroxyl Functional Acrylic Polymer

The hydroxyl functional acrylic polymer in Part A has a weight average molecular weight of from about 2000 g/mole to no greater than 15,000 g/mole, or no greater than 10,000 g/mole, or no greater than 5,000 g/mole; a glass transition temperature (Tg) of no greater than 20° C.; and a hydroxyl number (OH) of from about 10, or about 30, or about 50 to about 110, or to about 90. In one embodiment, the hydroxyl functional acrylic polymer has a viscosity of no greater than 8,000 cps, or no greater than 5000 cps at 77° F.

Herein, the hydroxyl functional acrylic polymer in Part A refers to the hydroxyl functional acrylic copolymer formed of alpha, beta-ethylenically unsaturated monomers, particularly (meth)acrylic monomers such as, ethyl(meth)acrylate, methyl (meth)acrylate, dimethacrylate, butyl (meth)acrylate, 2-ethyl, hexyl acrylate, and copolymerizeable alpha, beta-ethylenically unsaturated monomers such as acrylic acid acrylamide, acrylonitile, butadiene, 1,3-butylene diallyl fumarate, maleate, styrene, vinyl acetate, etc. At least one comonomer is a hydroxyl functional beta-ethytenically unsaturated monomer such as hydroxyl ethyl (meth)acrylate, 1,3-butylene glycol, etc., and/or a hydroxyl functional chain transfer agent e.g., 2-mercapo ethanol. Herein (meth)acrylate refers to acrylate and/or methacrylate.

Hydroxyl functional acrylic polymer also participates the cross-linking reaction between Part A and Part B of the adhesive once the two parts are mixed together. Therefore, the hydroxyl functional acrylic polymer has a hydroxyl number of from about 10, or about 30 to about 110, and preferably from about 50 to about 100 or to about 90.

Part B

The Part B of the adhesive, like Part A, is selected to be liquid at an ambient temperature, e.g., 77° F., and preferably has a viscosity of from about 2,000 cps to no greater than 15,000 cps, or no greater than 10,000 cps at 77° F.

Part B may simply be a liquid polyfunctional isocyanate, such as 4,4'-diphenylmethane diisocyanate (MDI) and its isomers, toluene diisocyanate (TDI), hexamethylene diisocyanate, isophorone diisocyanate, tetramethylxylene diisocyanate, modified diphenylmethane diisocyanate such as carbodiimide-modified diphenylmethane diisocyanate, allophanate-modified diphenylmethane diisocyanate, biuret-modified diphenylmethane diisocyanate, polymeric diphenylmethane diisocyanate, etc., and combinations thereof. To better enable the cured adhesive composition to meet the OTR requirements set forth above, it is preferred that the Part B be an isocyanate-terminated polyurethane prepolymer formed by reacting a polyol, such as any of the aforementioned polyols suitable as the first polyot in the Part A of the adhesive, with a polyfunctional isocyanate, such as any of those mentioned above.

For the sake of clarity, the polyol in Part A used to form the adhesive may be referred to as a first polyol, and the polyol reacted with the polyisocyanate to form the prepolymer may be referred to as a second polyol. It is understood that the second polyol used to form the prepolymer can be the same polyol as the first polyol used to form the adhesive composition, or can be a different polyol from the first polyol in Part A. The second polyol can be selected from the same list of polyols described above for the polyol (i.e., the first polyol) in Part A.

To ensure that the polyurethane prepolymer is isocyanate-terminated, the NCO/OH ratio of the poly-functional isocyanate and the second polyol is from about 2:1, or about 4:1, or about 6:1, to about 8:1.

The prepolymer preferably has a final percent isocyanate (NCO %) of from about 4%, or about 6% to about 20%, based on the weight of the prepolymer.

In some embodiments, the isocyanate-terminated polyurethane prepolymer of Part B is a reaction product of a first polyol and a carbodiimide-modified diphenylmethane diisocyanate, the first polyol being a polyether polyol having a number average molecular weight of no less than 1,000 g/mole.

In some embodiments, the isocyanate-terminated polyurethane prepolymer of Part B is a reaction product of a first polyol and a carbodiimide-modified diphenylmethane diisocyanate, the first polyol being a combination of a polyether polyol having a number average molecular weight of no less than 1,000 g/mole and a castor oil polyol.

In some embodiments, the isocyanate-terminated polyurethane prepolymer of Part B is a reaction product of a first polyol and a carbodiimide-modified diphenylmethane diisocyanate, the first polyol being a combination of a polyether polyol having a number average molecular weight of no less than 1,000 g/mole and a polyester polyol formed of adipic acid and diethyl glycol.

The prepolymer is preferably a liquid at ambient temperature, and has a viscosity that allows it to be easily processed. In some embodiments, the prepolymer has a viscosity of from about 2,000 cps, or about 4,000 cps, to no greater than 15,000 cps, or no greater than 10,000 cps at 77° F.

Other Additives

The adhesive composition may also include other optional additives in either Part A or Part B, which include, e.g., antioxidants, plasticizers, adhesion promoters, catalysts, catalyst deactivators, rheology modifiers, colorants (e.g., pigments and dyes), surfactants, waxes, and mixtures thereof.

Plasticizer, when present, is preferably present in an amount of from about 0.25% by weight to about 10% by weight, no greater than about 5% by weight, no greater than about 3% by weight, or even from about 0.5% by weight to about 2% by weight.

The adhesive may optionally include thermoplastic polymers including e.g., ethylene vinyl acetate, ethylene-acrylic acid, ethylene methacrylate and ethylene-n-butyl acrylate copolymers, polyether/polyester e.g., HYTREL material, polyvinyl alcohol, hydroxyethylcellulose, hydroxylpropylcellulose, polyvinyl methyl ether, polyethylene oxide, polyvinylpyrrolidone, polyethyloxazolines, starch, cellulose esters, and combinations thereof.

Laminate

The laminate of the invention includes at least a first substrate, a second substrate, and any one of the aforementioned adhesive compositions laminated between the two substrates. The first and the second substrates may be of the same or a different material.

Preferably, the first and/or the second substrate is/are a flexible film. Preferably, the film substrate material is selected such that each substrate exhibits an oxygen transmission rate (OTR) of at least about 300 cc/(100 in$^2$-day), tested according to the herein described OTR Test Method.

The laminate exhibits, after adhesive cure, an oxygen transmission rate (OTR) percent decrease of no greater than 7%, or no greater than 5%, or no greater than 4%, or even no greater than 3%, relative to the oxygen transmission rate (OTR) of the first and the second substrates in combination without the adhesive.

The disclosed adhesive composition can be used with a variety of flexible film substrates including, e.g., polymeric films prepared from polymers including such as polypropylene, polyethylene, low density polyethylene, linear low density polyethylene, high density polyethylene, polyethylene ionomer, polypropylene, oriented polypropylene, etc., as well as paper, and combinations thereof.

Methods of Making and Using

Any suitable method of making flexible laminates can be used to make the laminate of the invention. One useful method includes applying the adhesive in the liquid form to a first substrate, e.g., a flexible film, then contacting a second substrate, e.g., a same or different flexible film with the adhesive bearing surface of the first substrate such that the two substrates are bonded together to form a laminate.

In some embodiments, the adhesive composition may be applied using any suitable coating process including, e.g., air knife, trailing blade, spraying, brushing, dipping, doctor blade, roll coating, multi-roll transfer coating, gravure coating, offset gravure coating, rotogravure coating, or combinations thereof. Useful coating temperatures range from about 20° C. to about 50° C. Lower temperatures are preferred during the solventless laminating process in order to extend the working life of the adhesive composition. The coating weight of the adhesive may vary broadly depending on the properties desired of the laminate. Useful adhesive coating weights include, e.g., from about 0.05 mil to about 0.1 mil. Once coated, the first film substrate is contacted with a second film substrate. The second substrate may be of the same or different material relative to the first substrate. To make a multi-layered laminate, the laminating procedure herein described may be repeated a number of times, so that it is possible to produce laminates which consist of more than two bonded layers. In some embodiments, when manufacturing flexible laminates, the disclosed adhesive composition can be processed on laminator units at line speeds up to about 600 meters/min.

The resulting laminates can be converted into various packaging products, especially food packaging products, e.g., bags, pouches, stand-up pouches, zippered pouches, etc. Exemplary food items include fresh produce such as fresh cut vegetables, leafy vegetables, fresh fruits, fresh cut fruit, as well as fish and meat.

The present disclosure may be better understood with reference to the following examples. These examples are intended to be representative of specific embodiments of the disclosure and are not intended to be limiting to the scope of the disclosure.

All parts, ratios, percents, and amounts stated herein and in the examples are by weight unless otherwise specified.

EXAMPLES

Test Methods

Oxygen Transmission Rate (OTR)

Oxygen Transmission Rate (OTR) is determined according to ASTM D 3985-05 (reapproved 2010) entitled "Standard Test Method for Oxygen Gas Transmission Rate Through Plastic :Film and Sheeting Using a Coulometric Sensor" as follows, and is reported in units of "cubic centimeter (cc)/ (100 square inch (in$^2$)-day), or (cc/(100 in$^2$-day))":

(I) Test Conditions:

Test Gas: Oxygen; Test Gas Concentration: 100% $O_2$; Test Gas Humidity: 0% RH; Test Gas Pressure: 760 mmHg; Test Temperature: 23.0° C. (73.4° F.); Carrier Gas: 98% $N_2$, 2% $H_2$; Carrier Gas Humidity: 0% RH; Thickness of Film Sample: at film thickness as supplied from film manufacturer.

(II) Laminate Sample Preparation:

A laminate sample to be tested is prepared by laminating a first polymeric film (an example of which is a 12 micron (0.48 mil) thick polypropylene (PP) film available under the BOMT trade designation from Vifan (Toronto, Canada); OTR of 319 cc/(100 in$^2$-day)) to a second polymeric film (an example of which is a 32 micron (1.25 mil) thick low density polyethylene film (LDPE) available under the XCC-8138 trade designation from Charter (Superior, Wis.); OTR: 607 cc/(100 in2-day)) through a 0.08 mil layer of a laminating adhesive composition. The adhesive composition is cured for at least seven (7) days at 77° F. and 50% relative humidity after making the lamination prior to the testing.

Oxygen Transmission Rate (OTR) Percent Decrease (%) Determination Method

Oxygen transmission rate (OTR) percent decrease (%) of a laminate sample, prepared according to the herein described OTR Test Method-Part (II), is determined by the following equation:

$$\text{OTR percent decrease (\%)}=[(OTR_C-OTR_L)/OTR_C]\times 100$$

wherein $OTR_L$ is the oxygen transmission rate (OTR) of a laminate sample determined according to the herein described OTR Test Method; $OTR_C$ is the Oxygen transmission rate (OTR) of the same first and second polymeric films as that used in the laminate sample in combination without the adhesive. Herein the $OTR_C$ of the first polymeric film and the second polymeric film in combination without an adhesive is no less than 180 cc/(100 in$^2$-day), and is determined by the following equation:

$$OTR_C = (1/OTR_{F1} + 1/OTR_{F2})^{-1}$$

wherein $OTR_{F1}$ is the oxygen transmission rate (OTR) of the same first polymeric film as that used in the laminate sample and measured according to the herein described OTR Test Method; $OTR_{F2}$ is the oxygen transmission rate (OTR) of the same second polymeric film as that used in the laminate sample and measured according to the herein described OTR Test Method.

Viscosity

The viscosity is determined using a Brookfield Programmable Rheometer Model DV-III using Spindle #27 at 50 RPM and about 10.5 gram (g) of sample material at 77° F.±1° F.

Initial Viscosity

Initial viscosity of an adhesive is determined using a Brookfield Programmable Rheometer Model DV-III using Spindle #27 at 25 RPM, and about 10.5 gram (g) of sample material at 105° F.±1° F.

Average Molecular Weight

Weight average molecular weight (MW) and number average molecular weight (MN) are determined according to ASTM D 5296-05 entitled "Standard Test Method for Molecular Weight Averages and Molecular Weight Distribution of Polystyrene by High Performance Size Exclusion Chromatography.

Glass Transition Temperature (Tg)

Glass transition temperature (Tg) is determined by ASTM D3418-03 entitled "Standard Test Method for Transition Temperatures and Enthalpies of Fusion and Crystallization of Polymers by Differential Scanning calorimetry".

Hydroxyl (OH) Number

Hydroxyl number (OH number) is determined by ASTM E 222-00 entitled "Standard Test Method for :Hydroxyl Groups Using Acetic Anhydride Acetylation".

Percent Isocyanate (NCO %)

Percentage isocyanate (NCO %) of a prepolymer is determined by ASTM D2572-97 entitled "Standard Test Method for Isocyanate Groups in Urethane Materials or Prepolymers".

EXAMPLES

Prepolymers

The following prepolymers were used for making the adhesives to be tested in the Examples:

Prepolymer 1

Prepolymer 1(P-1) was prepared by reacting 449.44 grams of a polyester polyol (MN: 500 g/mole, OH number: 200) made of adipic acid and 2-methyl-1,3-propanediol with 1215.17 grams of MONDUR® CD (a carbodiimide modified MDI) at NCO/OH ratio of 4.76:1 under vacuum at 180° F. for about 2 hours. The final percent isocyanate of Prepolymer 1 was 17.0%, and the viscosity at 105° F. was 2500 cps.

Prepolymer 2

Prepolymer 2 (P-2) was prepared by reacting 229.07 grams of a polypropylene glycol ether diol (MN: 1000 g/mole, OH number: 110) with 270.93 grams of MONDUR® CD (a carbodiimide modified MDI) at NCO/OH ratio of 4.15:1 under dry nitrogen gas at 175° F. for about 2.5 hours. The final percent isocyanate of Prepolymer 2 was 12.0%, and the viscosity at 105° F. was 2250 cps.

Prepolymer 3

Prepolymer 3 (P-3) was prepared by reacting 263.61 grams of a polyester diol (MN: 530 g/mole, OH number: 210) made of adipic acid and diethylene glycol and 263.61 grams of a polypropylene glycol ether diol (MN: 2000 g/mole, OH number: 56) with 1072.78 grams of MONDUR® CD (carbodiimide modified MDI) at NCO/OH ratio of 6.03:1 under dry nitrogen gas at 180° F. for about 2 hours. The final percent isocyanate of Prepolymer 3 was 16.5%, and the viscosity at 105° F. was 960 cps.

Prepolymer 4

Prepolymer 4 (P-4) was prepared by reacting 275.58 grams dry castor oil polyol (OH number: 164) and 275.58 grams of a polypropylene glycol ether diol (MN: 2000 g/mole, OH number: 56) with 1048.85 grams of MONDUR® CD (carbodiimide modified MDI) at NCO/OH ratio of 6.82:1 under dry nitrogen gas at 175° F. for about 2.5 hours. The final percent isocyanate of Prepolymer 4 was 16.5%, and the viscosity at 105° F. was 1420 cps.

Liquid Solution A

Liquid Solution A (LS-A) was prepared by mixing 800 grams of JONCRYL® 960 (hydroxyl functional acrylic polymer, MW: 3750 g/mole; OH number: 83, Tg: −44° C.) with 800 grams of dry castor oil polyol (OH number: 164) at room temperature under dry nitrogen gas for about 30 min. to form a homogeneous liquid mixture.

Liquid Solution B

Liquid Solution B (LS-B) was prepared by mixing 900 grams of a polypropylene glycol ether triol (MN: 3000 g/mole, OH number: 56) with 1100 grams of JONCRYL® 960 (hydroxyl functional acrylic polymer, MW: 3750 g/mole; OH number: 83, Tg: −44° C.) at room temperature under dry nitrogen gas for about 30 min. to form a homogeneous liquid mixture.

Liquid Solution C

Liquid Solution C (LS-C) was prepared by mixing 440 grams of a polypropylene glycol ether triol (MN: 3000 g/mole, OH number: 56) with 560 grams of a polyester polyol (MN: 500 g/mole, OH number: 200) made of adipic acid and 2-methyl 1,3-propanediol at room temperature under dry nitrogen gas for about 30 min. to form a homogeneous liquid mixture.

Liquid Solution D

Liquid Solution D (LS-D) was prepared by mixing 100 grams of JONCRYL® 960 (hydroxyl functional acrylic polymer, MW: 3750 g/mole; OH number: 83, Tg: −44° C.) with 900 grams of dry castor oil polyol (OH number: 164) at room temperature under dry nitrogen gas for about 30 min. to form a homogeneous liquid mixture.

Liquid Solution E

Liquid Solution E (LS-E) was prepared by mixing 900 grams of JONCRYL® 963 (hydroxyl functional acrylic polymer, MW: 1810; OH number: 130, Tg: −59° C.) with 900 grams of dry castor oil polyol (OH number: 164) at room temperature under dry nitrogen gas for about 30 min. to form a homogeneous liquid mixture.

Liquid Solution F

Liquid Solution F (LS-F) is a 1800 grams of a liquid polypropylene glycol ether triol (MN: 700 g/mole, OH number: 240).

Liquid Solution G

Liquid Solution G (LS-G) was prepared by mixing 900 grams of a polyester polyol (MN: 670 g/mole, OH number: 200, OH functionality of 2.4) made of adipic acid, diethylene glycol and trimethylolpropane with 50 grams of a polypropylene glycol (MN: 1000 g/mole, OH number: 110) and 50 grams of a polypropylene glycol ether triol (MN: 700 g/mole, OH number: 240) at room temperature under dry nitrogen gas for about 30 min, to form a homogeneous liquid mixture.

Liquid Solution H

Liquid Solution H (LS-H) was prepared by mixing 400 grams of a polypropylene glycol ether triol (MN: 3000 g/mole, OH number: 56) with 600 grams of a castor oil polyol (OH number: 164) at room temperature under dry nitrogen gas for about 30 min. to form a homogeneous liquid mixture.

Examples 1-7 and Comparative Examples 1-6

Each adhesive composition of Examples 1-7 and Comparative Examples 1-6 was prepared by combining Part A and Part B according to Table 1 at an NCO/OH ratio of 1.25:1 at room temperature prior to the lamination.

Each laminate of Examples 1-7 and Comparative Examples 1-6 was prepared by laminating a 12 micron (0.48 mil) thick polypropylene (PP) film (available under the BOMT trade designation from Vifan (Toronto, Canada), OTR: 319 cc/(100 in$^2$-day)) and a 32 micron (1.25 mil) thick low density polyethylene film (LDPE) (available under the XCC-8138 trade designation from Charter (Superior, Wis.), OTR: 607 cc/(100 in$^2$-day)) through a 0.08 mil layer of an adhesive composition of Examples 1-7 and Comparative Examples 1-6 between the two films. The oxygen transmission rate of the two films in combination without an adhesive is 209 cc/(100 in$^2$-day). The adhesive composition is cured for at least seven (7) days at 77° F. and 50% relative humidity after making the lamination prior to the testing.

The oxygen transmission rate of each laminate was determined according to the herein described OTR Test Method; the oxygen transmission rate percent decrease (%) of each laminate was determined according to the herein described OTR Percent Decrease Determination Method. Results are also listed in Table 1.

TABLE 1

| | Part A | Part B | Initial Viscosity (cps) at 105° F. | OTR (cc/(100 in$^2$-day)) | OTR percent decrease (%) |
|---|---|---|---|---|---|
| Ex 1 | LS-A | P-2 | 1700 | 204.5 | 2.2 |
| Com. Ex 1 | LS-D | P-2 | 1400 | 177.5 | 15.1 |
| Com. Ex 2 | LS-E | P-2 | 1200 | 170.5 | 18.4 |
| Com. Ex 3 | LS-F | P-2 | 1500 | 170 | 18.7 |
| Ex 2 | LS-A | P-3 | 985 | 205 | 1.9 |
| Com. Ex 4 | LS-G | P-3 | 600 | 183 | 12.4 |
| Ex 3 | LS-B | P-4 | 1600 | 202 | 3.3 |
| Com. Ex 5 | LS-C | P-4 | 1450 | 189 | 9.6 |
| Ex 4 | LS-A | P-4 | 1200 | 196 | 6.2 |
| Ex 5 | LS-A | P-1 | 1400 | 198 | 5.3 |
| Ex 6 | LS-B | P-1 | 1700 | 205 | 1.9 |
| Com. Ex 6 | LSC | P-1 | 1800 | 187 | 10.5 |
| Ex 7 | LS-H | P-1 | 1550 | 199 | 4.8 |

The above specification, examples and data provide a complete description of the disclosure. Since many embodiments can be made without departing from the spirit and scope of the disclosure, the invention resides in the claims hereinafter appended.

We claim:

1. A two-part solvent-free laminating adhesive for a laminate, comprising Part (A), a mixture of
   i) from about 20% by weight to about 80% by weight of a first polyol selected from the group consisting of polyether polyols, polyester polyols, polyester/polyether polyols, natural oil polyols, and combinations thereof, and
   ii) from about 20% by weight to about 80% by weight of a hydroxyl functional acrylic polymer having a weight average molecular weight of no greater than 15,000 g/mole, a glass transition temperature (Tg) of no greater than 20° C., and a hydroxyl number of from about 10 to about 110, the first polyol and the hydroxyl functional acrylic polymer being co-dissolved so as to form a homogeneous liquid solution, and Part (B), an isocyanate-terminated polyurethane prepolymer having a percentage isocyanate (NCO%) of from about 4% to about 20% based on the weight of the prepolymer, the Part (B) being present relative to the Part (A) at an NCO/OH ratio of at least about 1.1, wherein the laminate exhibits an oxygen transmission rate (OTR) percent decrease of no greater than 7% according to the OTR Percent Decrease Determination Method.

2. The adhesive of claim 1, wherein the first polyol in Part (A) is a polyether polyol having a number average molecular weight of no less than 1,000 g/mole.

3. The adhesive of claim 1, wherein the natural oil polyols in Part (A) are selected from the group consisting of soybean oil polyol, castor oil polyol, rapeseed oil polyol, and hydroxyl functional compounds that are isolated from, derived from or manufactured from animal oils and vegetable oils, and combinations thereof.

4. The adhesive of claim 1, wherein the first polyol in Part (A) is a castor oil polyol.

5. The adhesive of claim 1, wherein the first polyol in Part (A) is a combination of a polyether polyol having a number average molecular weight of no less than 1,000 g/mole and a castor oil polyol.

6. The adhesive of claim 1, wherein the hydroxyl functional acrylic polymer in Part (A) has a weight average molecular weight of from about 2000 g/mole to about 10,000 g/mole, and a hydroxyl number of from about 50 to about 90.

7. The adhesive of claim 1, wherein the isocyanate-tenninated polyurethane prepolymer in Part (B) is a reaction product of the first polyol and a polyisocyanate at an NCO/OH ratio of from about 2:1 to about 8:1, wherein the polyisocyanate is selected from a group consisting of a diphenylmethane diisocyanate and its isomers; toluene diisocyanate; a modified diphenylmethane diisocyanate selected from the group consisting of a carbodiimide-modified diphenylmethane diisocyanate, an allophanate-modified diphenylmethane diisocyanate, a biuret-modified diphenylmethane diisocyanate, a polymeric diphenylmethane diisocyanate; and combinations thereof.

8. The adhesive of claim 7, wherein the first polyol is a polyether polyol having a number average molecular weight of no less than 1,000 g/mole and the polyisocyanate is a carbodiimide-modified diphenylmethane diisocyanate.

9. The adhesive of claim 7, wherein the first polyol is a combination of a polyether polyol having a number average molecular weight of no less than 1,000 g/mole and a castor oil polyol, and the polyisocyanate is a carbodiimide-modified diphenylmethane diisocyanate.

10. A method of making a laminate that comprises a first substrate and a second substrate, the method comprising
    applying a two-part solvent-free adhesive of claim 1 to a surface of the first substrate to form an adhesive bearing surface of the first substrate, and
    contacting a surface of the second substrate with the adhesive bearing surface of the first substrate to form the laminate.

11. The method of claim 10, wherein the first and the second substrates are the same or different film material, each exhibiting an oxygen transmission rate (OTR) of at least about 300 cc/(100 in$^2$-day) when tested according to the herein described OTR Test Method, and each being selected from the group consisting of polyethylene, polypropylene, paper, and laminates thereof.

12. The method of claim 10, wherein the first polyol in Part (A) of the adhesive is a combination of a polyether polyol having a number average molecular weight of no less than 1,000 g/mole and a castor oil polyol.

13. The method of claim 10, wherein the isocyanate-terminated polyurethane prepolymer of Part (B) is a reaction product of the first polyol and carbodiimide-modified diphenylmethane diisocyanate, the first polyol being a combination of a polyether polyol having a number average molecular weight of no less than 1,000 g/mole and a castor oil polyol.

14. A laminate, comprising
a first and a second substrates adhered by the adhesive of claim 1.

15. The laminate of claim 14, wherein the first and the second substrates are the same or different film material, each exhibiting an oxygen transmission rate (OTR) of at least about 300 cc/(100 in$^2$-day), when tested according to the herein described OTR Test Method, and each being selected from the group consisting of polyethylene, polypropylene, paper, and laminates thereof.

16. The laminate of claim 14, wherein the first polyol in Part (A) of the adhesive is a polyether polyol having a number average molecular weight of no less than 1,000 g/mole.

17. The laminate of claim 14, wherein the first polyol in Part (A) of the adhesive is a combination of a polyether polyol having a number average molecular weight of no less than 1,000 g/mole and a castor oil polyol.

18. The laminate of claim 14, wherein the isocyanate-terminated polyurethane prepolymer in Part (B) of the adhesive is a reaction product of the first polyol and carbodiimide-modified diphenylmethane diisocyanate, the first polyol being a combination of a polyether polyol having a number average molecular weight of no less than 1,000 g/mole and a castor oil polyol.

19. A packaged food article, comprising
a laminate of claim 14 in a form of a food package, and
a food product contained inside of the food package.

20. A two-part solvent-free laminating adhesive for a laminate, comprising Part (A), a mixture of
i) from about 20% by weight to about 80% by weight of a first polyol selected from the group consisting of polyether polyols, polyester polyols, polyester/polyether polyols, natural oil polyols, and combinations thereof, and
ii) from about 20% by weight to about 80% by weight of a hydroxyl functional acrylic polymer having a weight average molecular weight of no greater than 15,000 g/mole, a glass transition temperature (Tg) of no greater than 20° C., and a hydroxyl number of from about 10 to about 110, the first polyol and the hydroxyl functional acrylic polymer being co-dissolved so as to form a homogeneous liquid solution, and Part (B), an isocyanate-terminated polyurethane prepolymer that is a reaction product of a polyol and a polyfunctional isocyanate selected from a group consisting of 4,4'-diphenylmethane diisocyanate (MDI) and its isomers, toluene diisocyanate (TDI), hexamethylene diisocyanate, isophorone diisocyanate, tetramethylxylene diisocyanate, modified diphenylmethane diisocyanate including carbodiimide-modified diphenylmethane diisocyanate, allophanate-modified diphenylmethane diisocyanate, biuret-modified diphenylmethane diisocyanate, and polymeric diphenylmethane diisocyanate, and combinations thereof, the Part (B) being present relative to the Part (A) at an NCO/OH ratio of at least about 1.1, wherein the laminate exhibits an oxygen transmission rate (OTR) percent decrease of no greater than 7% according to the OTR Percent Decrease Determination Method.

* * * * *